(12) United States Patent
Ouchi

(10) Patent No.: US 9,709,728 B2
(45) Date of Patent: Jul. 18, 2017

(54) LIGHT GUIDE AND ILLUMINATION DEVICE

(71) Applicant: KYOCERA Document Solutions Inc., Osaka (JP)

(72) Inventor: Kei Ouchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 246 days.

(21) Appl. No.: 14/289,247

(22) Filed: May 28, 2014

(65) Prior Publication Data

US 2014/0355290 A1 Dec. 4, 2014

(30) Foreign Application Priority Data

May 31, 2013 (JP) ................................. 2013-116519
May 31, 2013 (JP) ................................. 2013-116522

(51) Int. Cl.
*F21V 7/04* (2006.01)
*F21V 8/00* (2006.01)
(Continued)

(52) U.S. Cl.
CPC ........... *G02B 6/0096* (2013.01); *G02B 6/001* (2013.01); *G03G 15/04036* (2013.01); *H04N 1/02835* (2013.01)

(58) Field of Classification Search
CPC .... G02B 6/0036; G02B 6/001; G02B 6/0058; G02B 6/0043; G02B 6/0055; G02B 6/0061; F21K 9/52
(Continued)

(56) References Cited

U.S. PATENT DOCUMENTS 5,718,497 A * 2/1998 Yokoyama ........... G02B 6/0036
362/611
6,375,335 B1 4/2002 Tabata et al.
(Continued)

FOREIGN PATENT DOCUMENTS

EP 0 544 332 A1 11/1992
JP H0961633 A 3/1997
(Continued)

OTHER PUBLICATIONS

The extended European search report issued by European Patent Office on Oct. 20, 2014 in the corresponding European patent application No. 14170184.7—7 pages.
(Continued)

*Primary Examiner* — William Carter
(74) *Attorney, Agent, or Firm* — IP Business Solutions, LLC

(57) ABSTRACT

A light guide includes an incident surface, an exit surface and a reflective surface. The reflective surface is located opposite to the exit surface to extend in the main scanning direction and includes a plurality of light reflecting patterns formed to reflect the incident light toward the exit surface. The light reflecting patterns have an oval hemispherical shape rising toward the exit surface and a first diameter of the oval hemispherical shape along a sub-scanning direction is equal to or longer than a second diameter thereof along the main scanning direction. The light reflecting patterns are formed to vary the ratio of the first diameter to the height of the oval hemispherical shape depending upon the location on the reflective surface in the main scanning direction.

8 Claims, 15 Drawing Sheets

(51) Int. Cl.
*G03G 15/04* (2006.01)
*H04N 1/028* (2006.01)

(58) Field of Classification Search
USPC .................................................. 362/600–634
See application file for complete search history.

(56) References Cited

U.S. PATENT DOCUMENTS

| | | |
|---|---|---|
| 2008/0130318 A1 | 6/2008 | Park et al. |
| 2009/0154196 A1 | 6/2009 | Lin et al. |
| 2010/0284182 A1 | 11/2010 | Pan |
| 2012/0014136 A1* | 1/2012 | Lee ................... G02B 6/0036 362/625 |
| 2012/0140522 A1* | 6/2012 | Yagasaki ............. G02B 6/0058 362/625 |
| 2013/0033901 A1* | 2/2013 | Nishitani ............ G02B 6/0036 362/613 |

FOREIGN PATENT DOCUMENTS

| | | |
|---|---|---|
| JP | 3176317 B2 | 4/2001 |
| JP | 2003149639 A | 5/2003 |
| JP | 2010-277940 A | 12/2010 |
| JP | 2013077473 A | 4/2013 |

OTHER PUBLICATIONS

Notice of rejection mailed by Japan patent Office on Jul. 14, 2015 in the corresponding Japanese patent application No. 2013-116519.
Notice of rejection mailed by Japan patent Office on Jul. 14, 2015 in the corresponding Japanese patent application No. 2013-116522.

* cited by examiner

LIGHT GUIDE AND ILLUMINATION DEVICE

INCORPORATION BY REFERENCE

This application claims priority to Japanese Patent Application No. 2013-116519 filed on 31, May, 2013, and Japanese Patent Application No. 2013-116522 filed on 31, May, 2013, the entire contents of which are incorporated by reference herein.

BACKGROUND

The present disclosure relates to light guides and illumination devices and particularly relates to a technique for reflecting light, which has entered a light guide, toward the exit surface of the light guide.

Some image forming apparatuses, such as multifunction peripherals, employ as a light source section for an image reading device, such as a scanner, a line light source in which a rod-shaped, resin-made light guide is combined with an LED capable of emitting light to the interior of the light guide through a longitudinal end surface of the light guide. The light source section is required to linearly illuminate an original document to be read in synchronism with reading of a line sensor. For this purpose, a surface of the light guide opposite to an exit surface thereof through which light exits the light guide is provided with light reflecting or scattering patterns, so that the patterns can deflect light, which has entered the light guide, toward the exit surface to allow linear illuminating light to exit the light guide in the direction toward the original document.

However, with the above combination of the rod-shaped light guide with the LED, illuminating light emitted from different locations on the light guide and its exit surface in the longitudinal direction cannot have evenness because the direct light directly deflected by the light reflecting or scattering pattern surface after the incidence from the LED is different in illumination intensity from the indirect light totally reflected once or more by the outer periphery of the light guide and then deflected by the light reflecting or scattering pattern surface. To cope with this, for example, an illumination unit is proposed in which the light guide is not circular but polygonal in cross-sectional shape and is deformed in the main scanning direction to avoid that light from the LED may directly enter the light reflecting or scattering pattern surface.

Furthermore, considering only the indirect light, angled light beams are more likely to be totally reflected by the outer peripheral surface of the light guide and more likely to enter the light reflecting or scattering patterns and then exit the light guide. Therefore, there arises a problem in that with increasing distance from the incident surface of the light guide in the main scanning direction (the direction of the optical axis of light incident on the light guide from the light source section), the angle of light beam from the LED becomes smaller and, thus, the illumination distribution of indirect light in the sub-scanning direction (the direction perpendicular to the direction of the optical axis) during illumination onto the original document becomes narrower. As a solution to this problem, for example, an illumination unit is proposed in which the outer peripheral shape of the light guide is changed overall or locally in the longitudinal direction to vary with location the angular distribution of light beams incident on the light reflecting or scattering patterns, so that the illumination distribution of indirect light in the sub-scanning direction can be equalized over the entire region in the main scanning direction.

SUMMARY

A light guide according to one aspect of the present disclosure is formed of a light transmissive member extending in a direction of an optical axis of light incident on an interior of the light guide and configured to reflect the incident light in a specific direction. The light guide includes an incident surface, an exit surface, and a reflective surface.

The incident surface is provided at least one of both longitudinal ends of the light guide and allows light emitted from a light source to be incident thereon.

The exit surface forms one side surface of the light guide extending in the direction of the optical axis of the light incident through the incident surface and allows the incident light to exit the light guide therethrough.

The reflective surface is located opposite to the exit surface to extend in the direction of the optical axis and includes a plurality of light reflecting patterns formed to reflect the incident light toward the exit surface.

In addition, the light reflecting patterns have an oval hemispherical shape rising toward the exit surface and are formed to vary, depending upon location on the reflective surface in the direction of the optical axis, a ratio of a first diameter of the oval hemispherical shape to a height thereof when viewed laterally in the direction of the optical axis, the first diameter being perpendicular to the direction of the optical axis.

An illumination device according to another aspect of the present disclosure includes the aforementioned light guide and the light source.

DESCRIPTION OF EMBODIMENTS

Figure 1:
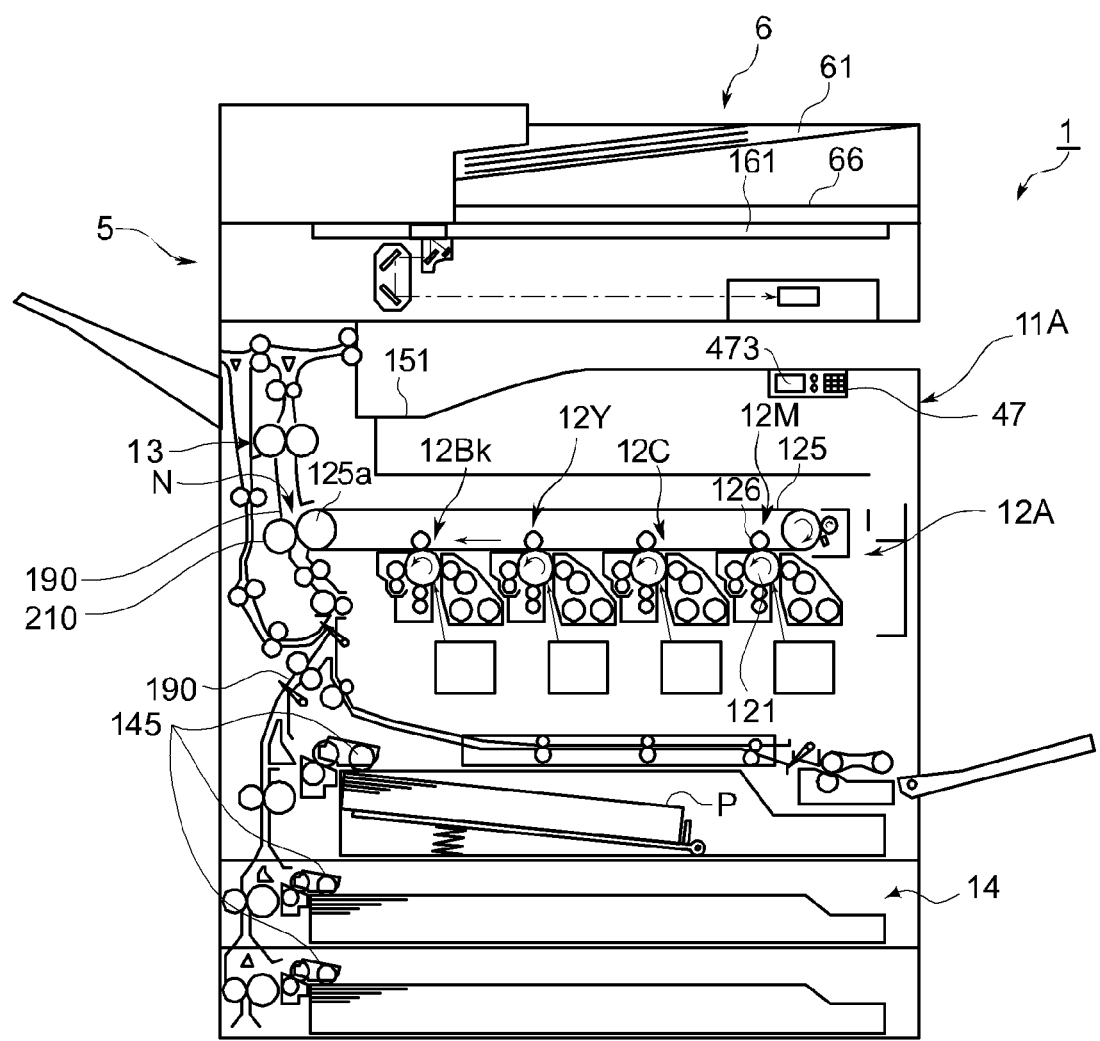
FIG. 1 is a front cross-sectional view showing the structure of an image forming apparatus including an image reading device equipped with an illumination device according to one embodiment of the present disclosure.

Hereinafter, a description will be given of a light guide according to a first embodiment of the present disclosure and an illumination device with the light guide with reference to the drawings. FIG. 1 is a front cross-sectional view showing the structure of an image forming apparatus including an image reading device equipped with an illumination device according to a first embodiment of the present disclosure.

The image forming apparatus 1 according to the first embodiment of the present disclosure is a multifunction peripheral having multiple functions including, for example, a copy function, a print function, a scan function, and a facsimile function. The image forming apparatus 1 is made up so that an apparatus body 11A thereof includes an operating section 47, an image forming section 12A, a fixing section 13, a paper feed section 14, a document feed section 6, an image reading device 5, and so on.

The operating section 47 is configured to receive operator's commands for various types of operations and processing executable by the image forming apparatus 1, such as a command to execute an image forming operation and a command to execute a document reading operation. The operating section 47 includes a display 473 configured to display operation guidance and so on for the operator.

In a document reading operation of the image forming apparatus 1, the image reading device 5 optically reads an image of an original document being fed from the document feed section 6 or an image of an original document placed on an original glass plate 161 to generate image data. The image data generated by the image reading device 5 is stored on an internal HDD, a network-connected computer or the like.

In an image forming operation of the image forming apparatus 1, the image forming section 12A forms a toner image on a recording paper sheet P serving as a recording medium fed from the paper feed section 14, based on image data generated by the document reading operation, image data received from a network-connected computer or a user terminal, such as a smartphone, or image data stored on the internal HDD. Each of image forming units 12M, 12C, 12Y, and 12Bk of the image forming section 12A includes a photosensitive drum 121, a developing device (not shown) operable to supply toner to the photosensitive drum 121, a toner cartridge (not shown) for holding toner, a charging device (not shown), an exposure device (not shown), and a primary transfer roller 126.

In the case of color printing, the image forming unit 12M for magenta, the image forming unit 12C for cyan, the image forming unit 12Y for yellow, and the image forming unit 12Bk for black of the image forming section 12A form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125 mounted around a drive roller 125a and a driven roller 125b.

The outer peripheral surface of the intermediate transfer belt 125 is set to an image carrying surface to which a toner image is to be transferred. The intermediate transfer belt 125 is driven by the drive roller 125a while engaging against the peripheral surfaces of the photosensitive drums 121. The intermediate transfer belt 125 endlessly runs between the drive roller 125a and the driven roller 125b while synchronizing with the rotation of each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the surface of the intermediate transfer belt 125, at a nip N between the secondary transfer roller 210 and the drive roller 125a with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure. The recording paper sheet P having a multicolor image fixed thereon by the completion of the fixing treatment is discharged to a paper output tray 151.

The paper feed section 14 includes a plurality of paper feed cassettes. A control section (not shown) rotationally drives a pick-up roller 145 of the paper feed cassette containing recording paper sheets of the size designated by an operator's command and thereby allows the pick-up roller 145 to feed a recording paper sheet P contained in the paper feed cassette toward the nip N.

Figure 2:
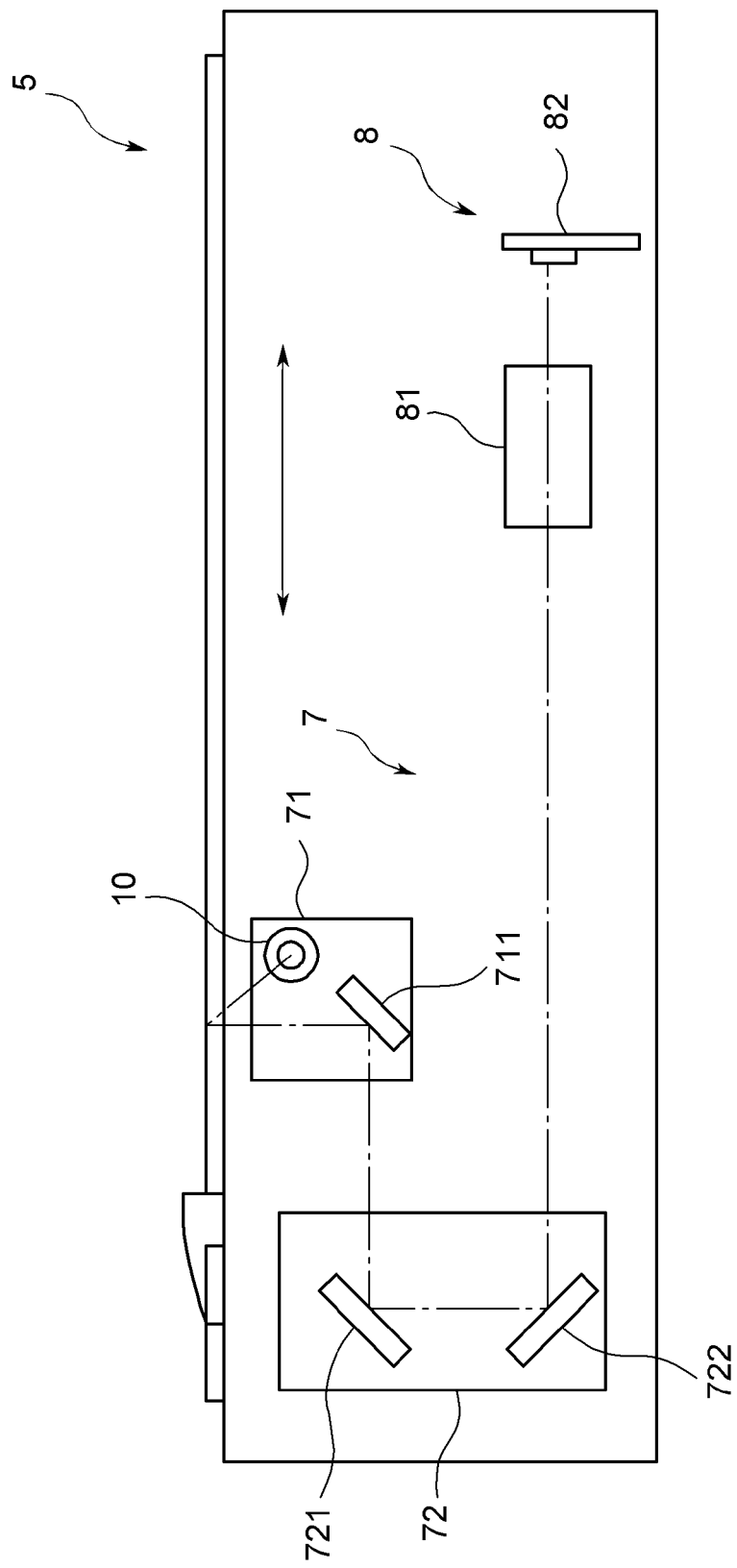
FIG. 2 is an internal side view showing a schematic structure of the image reading device.

Next, a description will be given of the structure of the image reading device 5. FIG. 2 is an internal side view showing a schematic structure of the image reading device 5.

The image reading device 5, as shown in FIG. 2, includes an optical scanning device 7 and an image pickup unit 8.

The optical scanning device 7 includes a first optical system unit 71 and a second optical system unit 72.

The first optical system unit 71 includes an illumination device 10 and a first mirror 711. The illumination device 10 is disposed facing and below the original glass plate 161 in order to illuminate a reading surface of an original document, i.e., illuminate above. The illumination device 10 includes a rod-shaped light guide and a light source disposed at a longitudinal end of the light guide, as will hereinafter be described in detail. The illumination device 10 extends in a depth direction of FIG. 2. The direction of extension of the illumination device 10 is a main scanning direction during reading of the original document.

The first mirror 711 is configured to receive light reflected on the reading surface of the original document placed on the original glass plate 161 by the application of light of the illumination device 10 to the original document and horizontally redirect the reflected light. The first mirror 711 is disposed below the original glass plate 161. The illumination device 10 and the first mirror 711 are mounted to an unshown support member.

The second optical system unit 72 includes a second mirror 721 and a third mirror 722. The second mirror 721 is configured to receive light reflected by the first mirror 711 of the first optical system unit 71 and redirect the reflected light substantially vertically downward. The third mirror 722 is configured to substantially horizontally redirect the reflected light from the second mirror 721 to guide it toward the image pickup unit 8. The second mirror 721 and the third mirror 722 are mounted to an unshown support member.

The illumination device 10 and the mirrors provided in the first and second optical system units 71, 72 have an elongated shape extending in the main scanning direction and having a length substantially equal to the length of the original glass plate 161.

The image reading device 5 is internally provided with an unshown traveling rail for use to guide the movement of the optical scanning device 7 in the direction of the arrow. Thus, the optical scanning device 7 equipped with the first and second optical system units 71, 72 can reciprocate in a sub-scanning direction (a direction perpendicular to the main scanning direction), i.e., in the direction of the arrow shown in FIG. 2, and in parallel with the surface of the original glass plate 161 to enable reading of image information of the entire reading surface of the original document placed on the original glass plate 161.

The image pickup unit 8 is fixed to a lower portion of the interior of the image reading device 5. The image pickup unit 8 includes an imaging lens 81 as an optical element and a line sensor 82 as an image pickup device. The light reflected on the reading surface of the original document and then reflected by the third mirror 722 of the second optical system unit 72 enters the imaging lens 81. The imaging lens 81 forms an image of the reflected light on a surface of the line sensor 82 provided downstream in the optical path. The line sensor 82 is configured to generate a voltage indicating and according to the intensity of light received thereon, i.e., convert optical information received by its light-receiving element into electrical signals, and output the signals to the unshown control section. In this manner, using the line sensor 82, the image of the original document to be read can be read by the image reading device 5.

Figure 3:
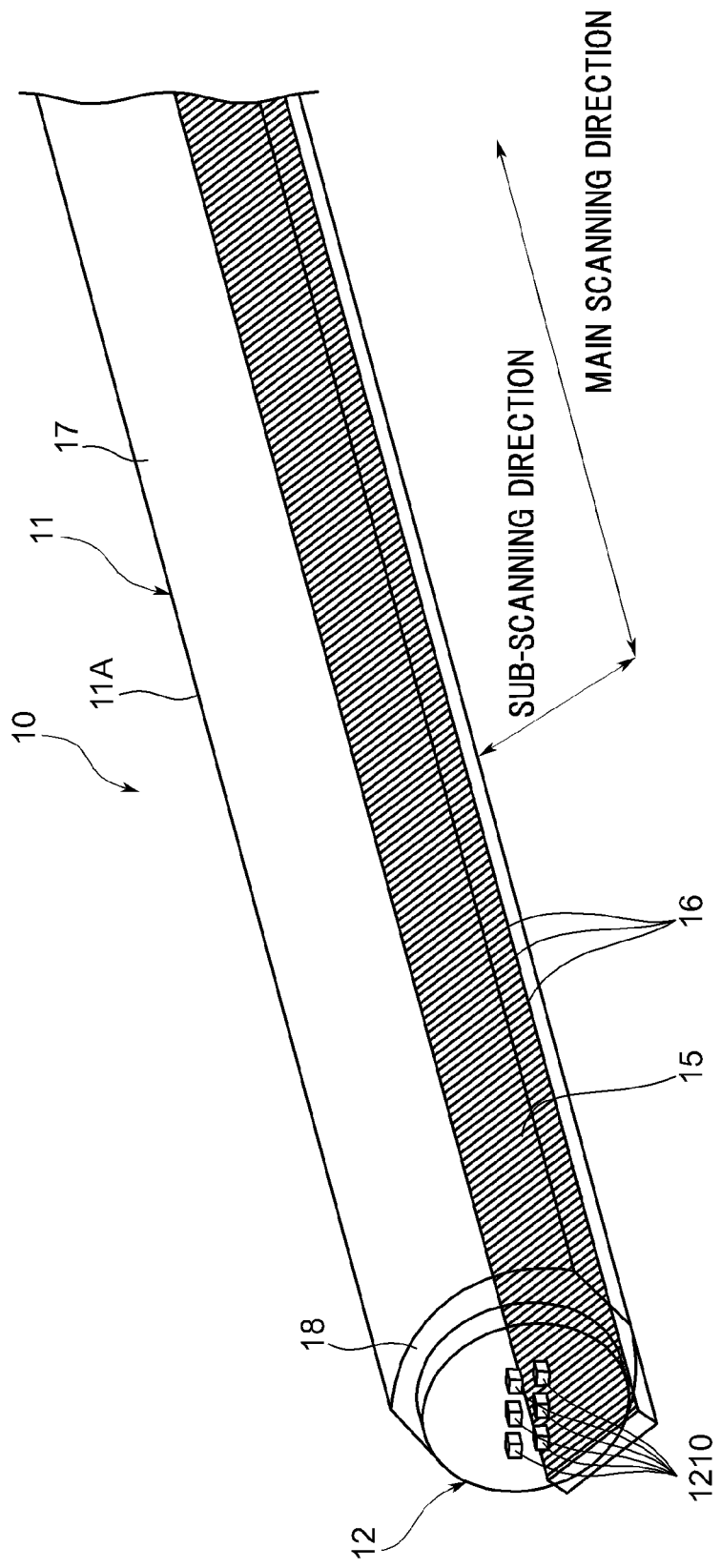
FIG. 3 is a perspective view showing the internal structure of the illumination device.

Next, a description will be given of the illumination device 10 included in the image reading device 5. FIG. 3 is a perspective view showing the internal structure of the illumination device 10.

The illumination device 10 includes a light guide 11 and a light source 12.

The light guide 11 extends in a direction of the optical axis of light incident on the interior of the light guide 11 from the light source 12. Since the light guide 11 extends in the main scanning direction as described previously, the direction of the optical axis coincides with the main scanning direction. The light guide 11 is formed of, for example, a light transmissive member made of resin and configured to reflect incident light, which has entered it from the light source 12, in a specific direction (a direction toward an exit surface 17) via a reflective surface 15.

The light guide 11 includes an incident surface 18, the exit surface 17, and the reflective surface 15 which are formed thereon.

At least one of both the longitudinal end surfaces of the light guide 11 provides the incident surface 18. A description in this embodiment will be given of the case where only one of the longitudinal end surfaces is the incident surface 18. The light source 12 is mounted to the incident surface 18. Light emitted from the light source 12 enters the interior of the light guide 11 through the incident surface 18.

The exit surface 17 extends in the main scanning direction and forms one side surface of the light guide 11. In this embodiment, the exit surface 17 forms a top surface of the light guide 11. The light having entered the interior of the light guide 11 through the incident surface 18 is reflected on the reflective surface 15 and then exits the light guide 11 through the exit surface 17.

The reflective surface 15 is located opposite to the exit surface 17 to extend in the sub-scanning direction. In this embodiment, the reflective surface 15 forms a bottom surface of the light guide 11. The reflective surface 15 includes a plurality of light reflecting patterns 16 formed to reflect the incident light toward the exit surface 17. The reflective surface 15 reflects the incident light, which has entered the interior of the light guide 11 through the incident surface 18, toward the exit surface 17 via the light reflecting patterns 16. The light reflecting patterns 16 are formed integrally with the light guide 11 from the same material as the light guide 11.

The light source 12 is formed of, for example, an LED 1210. The light source 12 is mounted on the exterior of the incident surface 18 of the light guide 11. In this embodiment, an example is shown where six LEDs 1210 are provided as the light source 12. The direction of emission of light of the light source 12 toward the interior of the light guide 11 through the incident surface 18 (the direction of the optical axis) is a longitudinal direction of the light guide 11, i.e., the main scanning direction.

Figure 4:
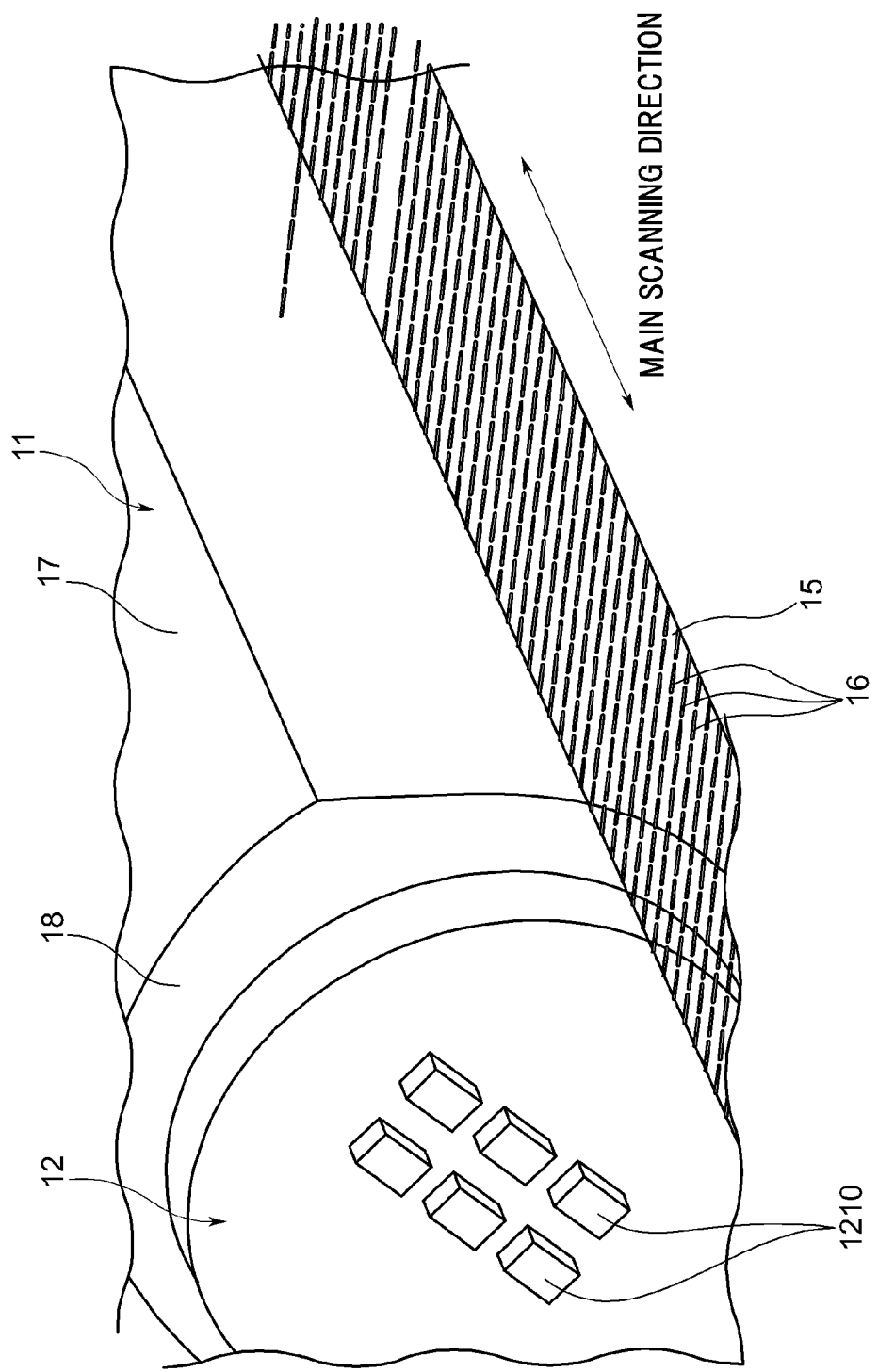
FIG. 4 is a perspective view showing light reflecting patterns formed on a reflective surface of the interior of a light guide.
Figure 5:
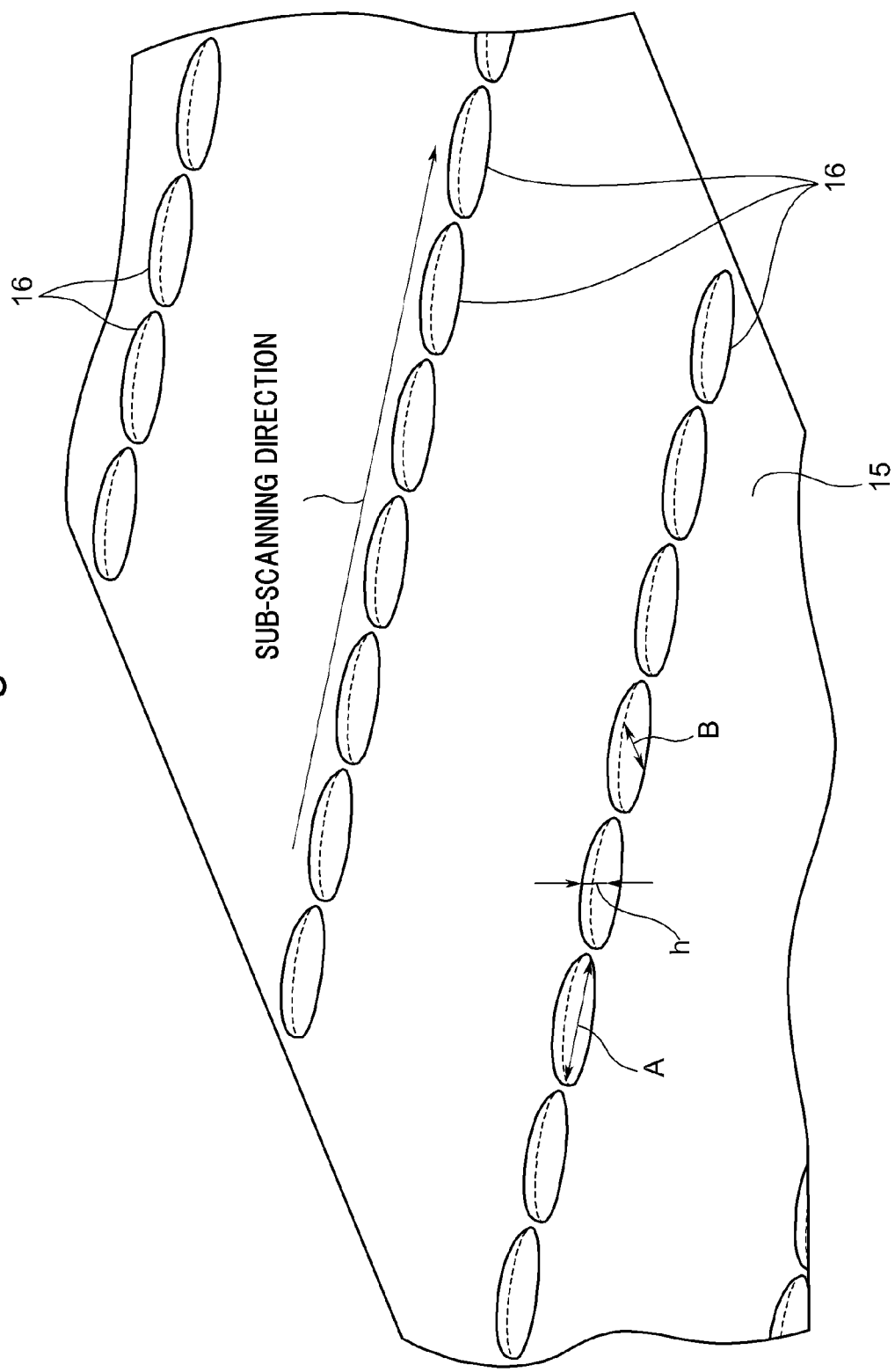
FIG. 5 is an enlarged perspective view showing the light reflecting patterns formed on the reflective surface.

Next, the light reflecting patterns 16 will be described. FIG. 4 is a perspective view showing the light reflecting patterns 16 formed on the reflective surface 15 of the interior of the light guide 11. FIG. 5 is an enlarged perspective view showing the light reflecting patterns 16 formed on the reflective surface 15.

The light reflecting patterns 16 are shape patterns formed to reflect and scatter light incident on themselves. The reflective surface 15 includes the light reflecting patterns 16 formed in a plurality of rows, each row consisting of a plurality of light reflecting patterns aligned in the sub-scanning direction, and the plurality of rows of light reflecting patterns 16 are arranged side by side in the main scanning direction. The rows of light reflecting patterns 16 are formed from a portion of the reflective surface 15 near the incident surface 18 to a portion thereof near the end surface of the light guide 11 opposite to the incident surface 18 in the main scanning direction.

If the light guide 11 had no light reflecting or scattering pattern, light incident on the interior of the light guide 11 through the incident surface 18 would propagate through the light guide 11 in the main scanning direction while being totally reflected on the outer peripheral surface of the light guide 11 and be finally guided to the end surface opposite to the incident surface 18 without leakage. In this case, the light from the light source 12 mounted on the incident surface 18 could not illuminate the original document. For this reason, the light reflecting patterns 16 are formed on the reflective surface 15 opposite to the exit surface 17 to reflect the incident light to scatter in the sub-scanning direction.

As shown in FIG. 5, each light reflecting pattern 16 has an oval hemispherical shape rising toward the exit surface 17. The light reflecting pattern 16 is formed so that a first diameter A thereof along the sub-scanning direction (the direction perpendicular to the direction of the optical axis) is equal to or longer than a second diameter B thereof along the main scanning direction (the direction of the optical axis). In the case where the light reflecting pattern 16 has such an oval hemispherical shape, when light incident on the interior of the light guide 11 through the incident surface 18 is reflected on the light reflecting pattern 16, reflected light traveling toward the exit surface 17 and reflected light scattering in the sub-scanning direction while traveling toward the exit surface 17 are obtained. In this embodiment, the oval hemispherical shape includes a hemispherical shape.

Furthermore, if the light reflecting pattern 16 of oval hemispherical shape is changed in the ratio between the height h of the oval hemispherical shape and the first diameter A thereof when viewed laterally in the direction of the optical axis of incident light from the light source 12 through the incident surface 18 (the main scanning direction), the range of scattering angles of the reflected light in the sub-scanning direction varies with changes in the ratio. The height of the oval hemispherical shape is the height at the top thereof.

Figure 6:
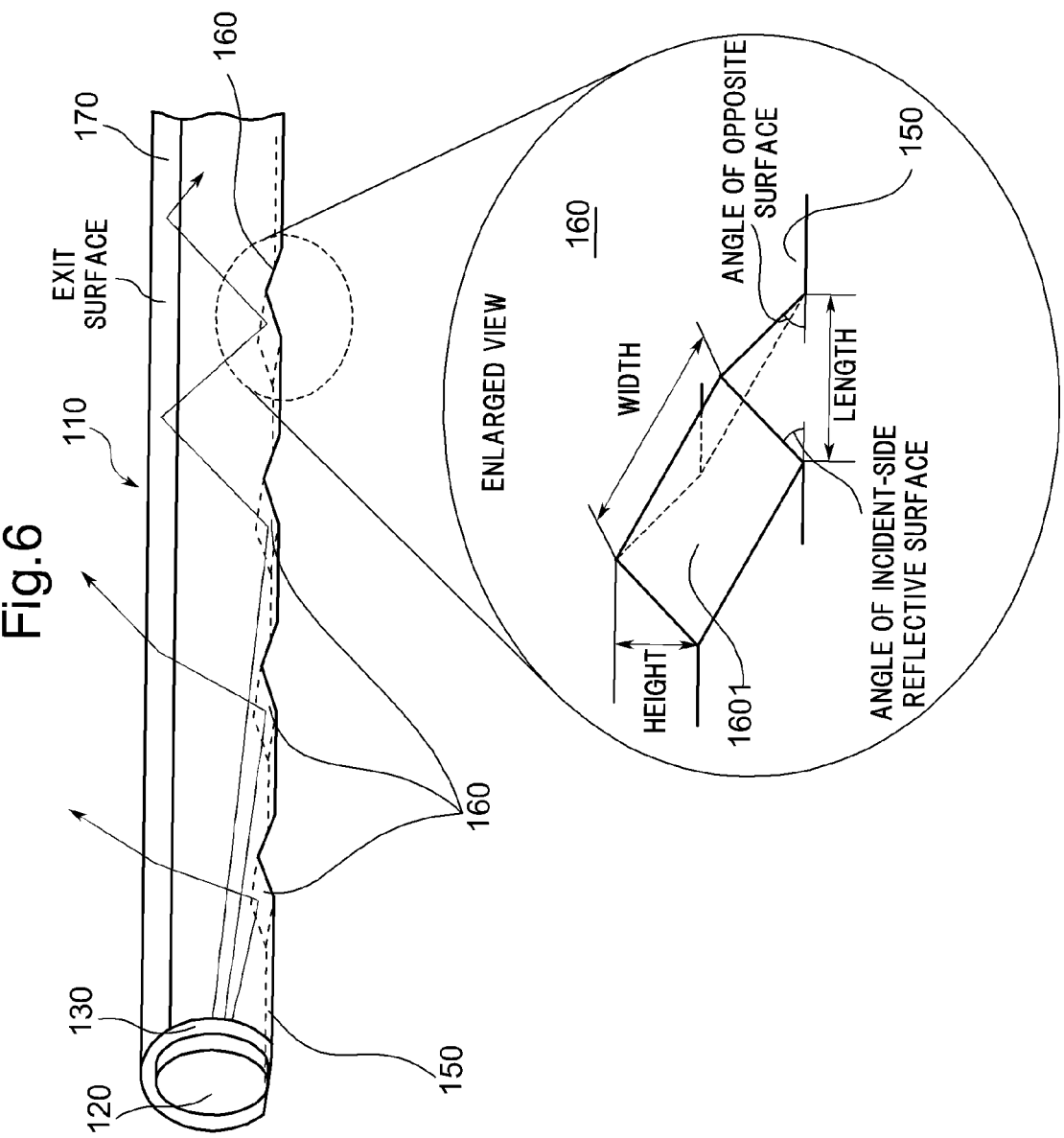
FIG. 6 is a view showing a light guide having planar, not oval hemispherical, light reflecting patterns.
Figure 7:
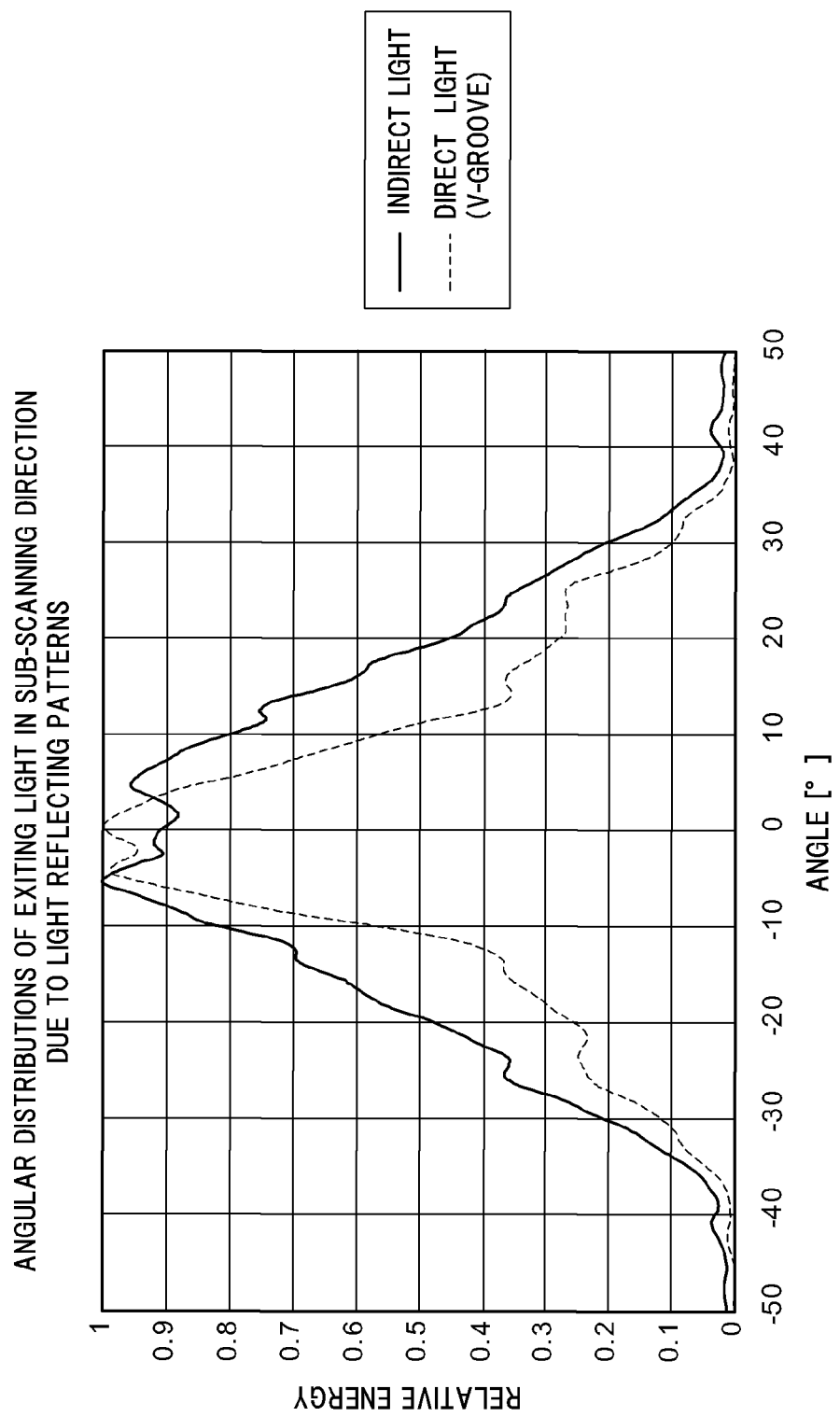
FIG. 7 is a graph showing diffusion distributions of reflected light in the sub-scanning direction due to the planar, not oval hemispherical, light reflecting pattern.

A description will now be given of light diffusion in the sub-scanning direction in the case where light incident on a general light guide through the incident surface thereof is reflected on the reflective surface thereof and exits the light guide through the exit surface thereof. FIG. 6 is a view showing a light guide 110 having planar, not oval hemispherical, light reflecting patterns. FIG. 7 is a graph showing diffusion distributions of reflected light in the sub-scanning direction due to the planar, not oval hemispherical, light reflecting pattern.

As shown in FIG. 6, a light guide 110 is generally known in which light reflecting patterns 160 formed of a prism having an inverted V-shape rising toward an exit surface 170 thereof are formed on a reflective surface 150 thereof. The light reflecting patterns 160 are formed integrally with the light guide 110 from the same material as the light guide 110. In such a light guide 110, the intensity of light reflected toward the exit surface 170 by light reflecting pattern surfaces 1601 of the light reflecting patterns 160 can be controlled by varying among the light reflecting patterns 160 the pitch in the main scanning direction, height or width. Therefore, by controlling the pitch, height or width among the light reflecting patterns 160 arranged at different locations in the main scanning direction, illuminating light emitted from the different locations in the main scanning direction can be equalized.

However, the light source 120 including an LED emits light toward the entire circumference of the light guide 110. Thus, there are produced direct light directly entering the light reflecting pattern surfaces 1601 from the light source 120 and indirect light entering the light reflecting pattern surfaces 1601 following the total reflection once or more on the outer peripheral surface of the light guide 110. The direct light and indirect light differ from each other in the range of angles of incident light beams on each light reflecting pattern surfaces 1601 in the sub-scanning direction. The direct light is light directly incident on each light reflecting pattern surface 1601 from the LED and, therefore, has shallow angles with respect to the light reflecting pattern surface 1601, resulting in a narrow angular distribution of exiting light beams through the exit surface in the sub-scanning direction. Unlike this, the indirect light is light incident on each light reflecting pattern surface 1601 in all directions from the entire circumference of the light guide 110 by total reflection. In addition, the light reflecting patterns 160 formed of a prism having an inverted V-shape, as far as the light diffusion in the sub-scanning direction goes, allow incident light to be reflected thereon at the same angle as the incident angle and exit the light guide 110 at that angle, without any deflection component in the sub-scanning direction. Therefore, as shown in FIG. 7, the direct light and indirect light differ from each other in the angular distribution of light beams in the sub-scanning direction after exiting from the light guide 110 depending upon the incident angle with respect to the light reflecting pattern surface 1601.

The quantity ratio between the direct light and indirect light differs among various locations in the interior of the light guide 110 in the main scanning direction. Therefore, light exiting the light guide 110 also has different illumination distributions in the sub-scanning direction among various locations on the light guide 110 in the main scanning direction. Hence, if there arises a movement of the document reading position during reading operation or an event in which the original document floats above the surface of the original glass plate 161, the reading position is displaced in the sub-scanning direction. Therefore, difference from reference data determined by shading in the main scanning direction may not be kept constant throughout the entire region in the main scanning direction, so that an image obtained by reading the original document may cause density variations in the main scanning direction.

Figure 8:
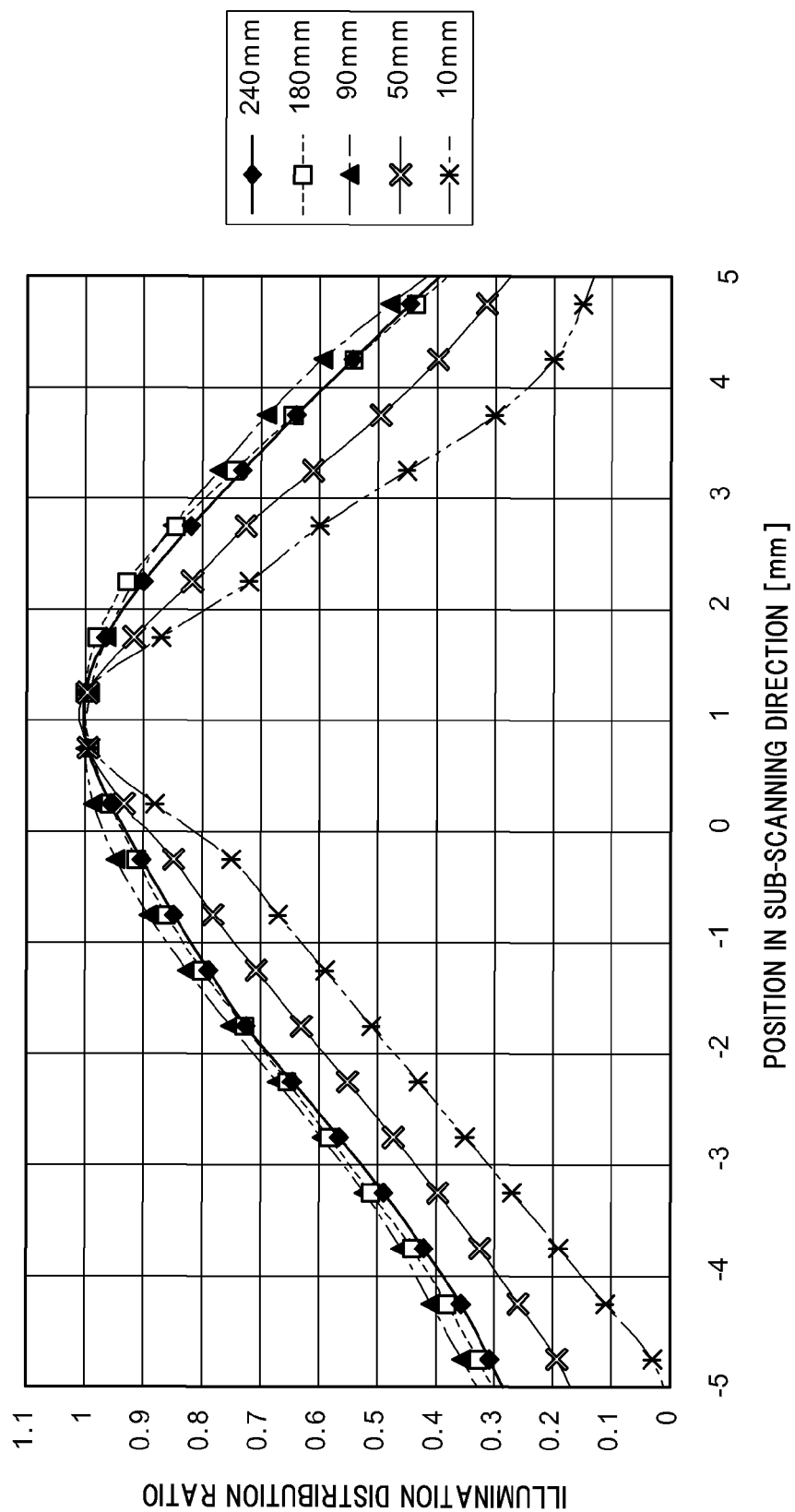
FIG. 8 is a graph showing the illumination distribution of indirect light of a light guide in the sub-scanning direction against the distance from a light source to various portions of the light guide in a main scanning direction.

FIG. 8 is a graph showing the illumination distribution of indirect light of the light guide 110 in the sub-scanning direction against the distance from the light source 120 to various portions of the light guide 110 in the main scanning direction. A region of the light guide 110 near the light source 120 and the incident surface 130 in the main scanning direction provides much direct light and little indirect light, a middle region thereof provides mainly indirect light, and the angular distribution of light beams of indirect light incident on the light reflecting patterns 160 becomes smaller with the approach to the terminal end of the light guide 110. Therefore, the illumination distribution of exiting light from the light guide 110 in the sub-scanning direction during illumination onto the original document, as shown in FIG. 8, differs among different locations on the light guide 110 in the main scanning direction depending upon the amount of indirect light at each location in the main scanning direction.

As seen from the above, in order to equalize the illumination distribution of exiting light, inclusive of direct light and indirect light, in the sub-scanning direction throughout the entire region of the light guide in the main scanning direction, it is necessary to finely control the diffusion force of light due to the light reflecting patterns according to location in the light guide in the main scanning direction. In the first embodiment, the light reflecting patterns 16 on the reflective surface 15 of the light guide 11 are formed to vary, depending upon the location on the reflective surface 15 in the main scanning direction, the ratio of the first diameter A to the height h of the oval hemispherical shape. Thus, the diffusion force of light can be controlled to achieve an equalized illumination distribution in the sub-scanning direction throughout the entire region of the light guide 11 in the main scanning direction.

Figure 9:
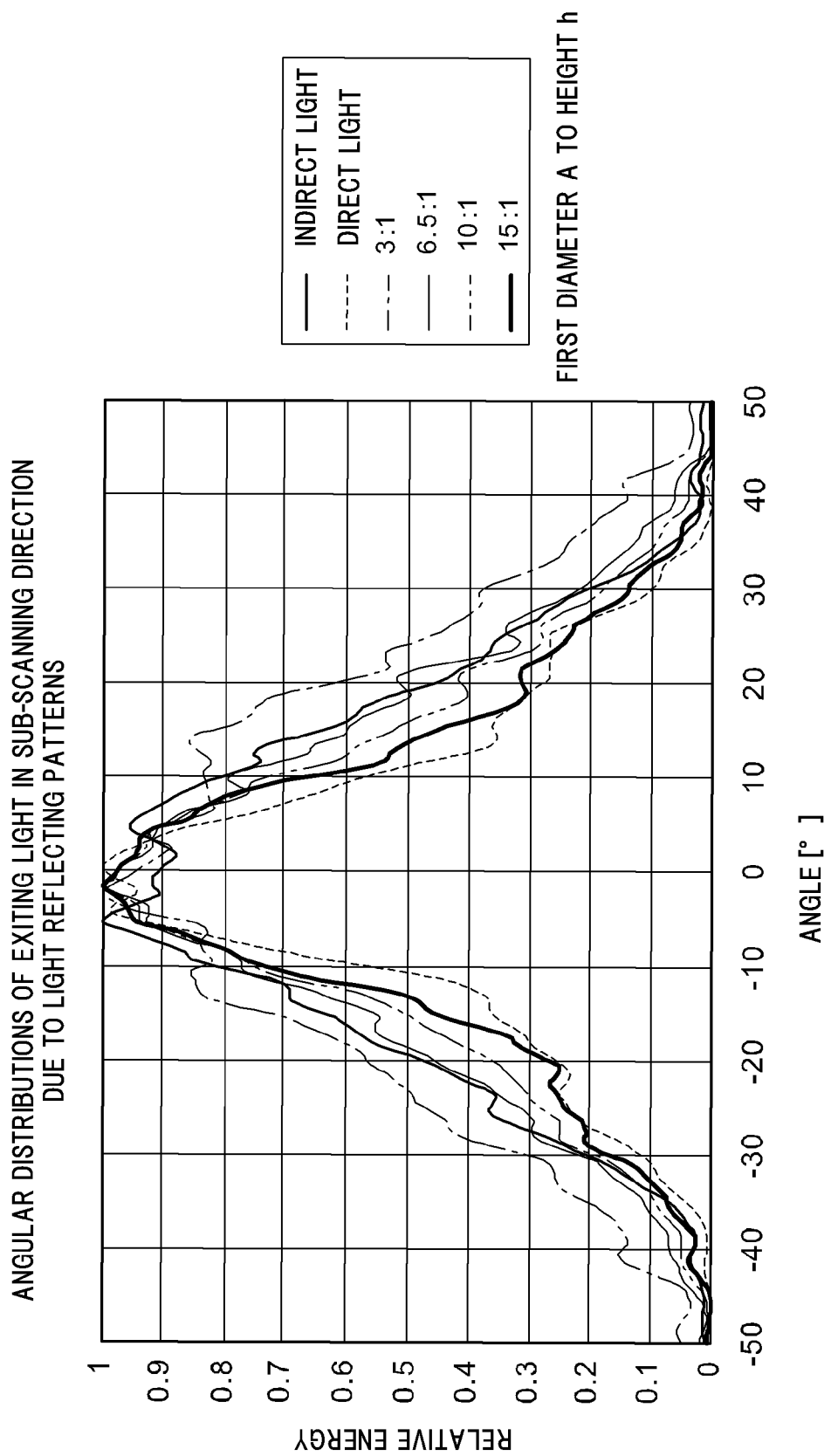
FIG. 9 is a graph showing the angular distributions of exiting light in a sub-scanning direction resulting from various light reflecting patterns with different ratios of the first diameter to the height of an oval hemispherical shape.
Figure 10:
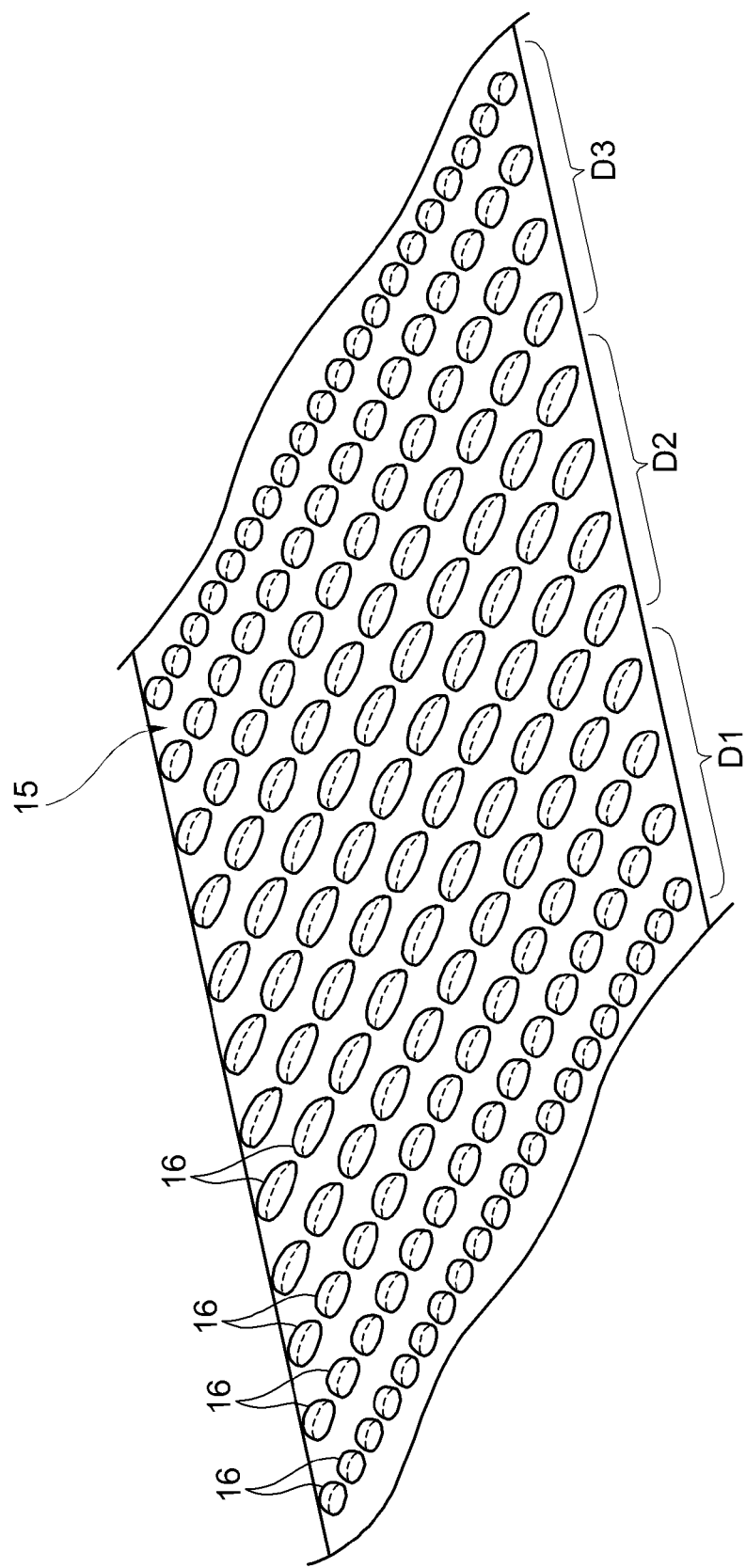
FIG. 10 is a perspective view showing an example of rows of light reflecting patterns with different ratios of the first diameter to the height of the oval hemispherical shape.
Figure 11:
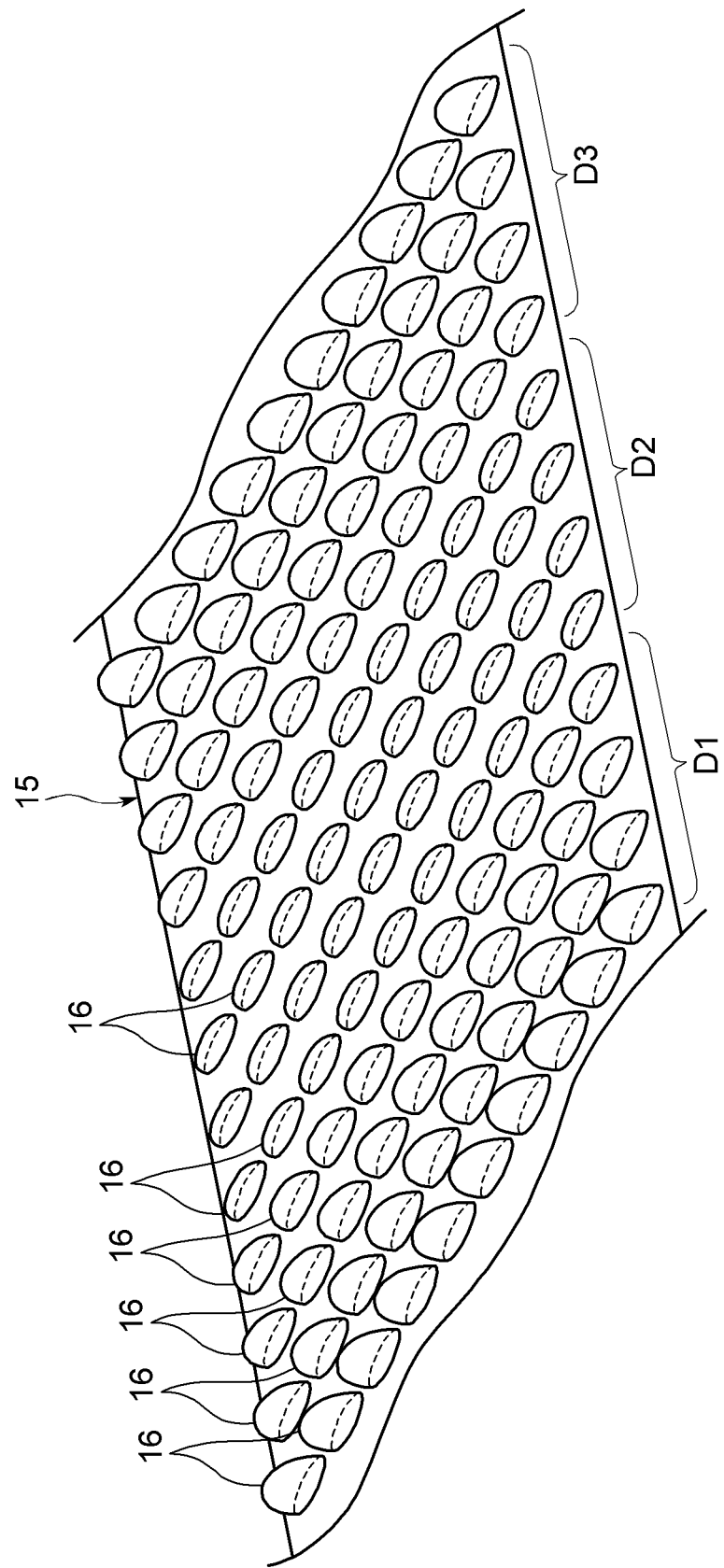
FIG. 11 is a perspective view showing another example of rows of light reflecting patterns with different ratios of the first diameter to the height of the oval hemispherical shape.

A description will be given of the control of the ratio of the first diameter A to the height h of the oval hemispherical shape of the light reflecting patterns 16 necessary to achieve an equalized illumination distribution in the sub-scanning direction throughout the entire region of the light guide 11 in the main scanning direction. FIG. 9 is a graph showing the angular distributions of exiting light in the sub-scanning direction resulting from various light reflecting patterns 16 with different ratios of the first diameter A to the height h of the oval hemispherical shape. FIG. 9 shows results obtained by experiments conducted by the inventor. FIGS. 10 and 11 are perspective views showing respective different examples of rows of light reflecting patterns 16 with different ratios of the first diameter A to the height h of the oval hemispherical shape.

FIGS. 10 and 11 merely conceptually illustrate differences in the angle of the light reflecting pattern 16 and the ratio of the first diameter A to height h thereof among various locations in the main scanning direction. Furthermore, to clarify the structure of the light guide 11, FIGS. 10 and 11 show arrangements of the light reflecting patterns 16 on the reflective surface 15 in which the light reflecting patterns 16 are different in number from those applied to the actual light guide 11.

As shown in FIG. 9, the aforementioned light reflecting patterns 16 of oval hemispherical shape have characteristics in which as the ratio of the first diameter A to height h of the oval hemispherical shape decreases to approach a true circle, the force of light diffusion in the sub-scanning direction increases to widen the angular distribution of exiting light.

Reference is now made of the illumination distributions in the sub-scanning direction at various locations on the light guide 11 in the main scanning direction shown in FIG. 8. In order to equalize the range of diffusion of exiting light from the light guide 11 in the sub-scanning direction at every location on the light guide 11 in the main scanning direction, it is necessary, in a region of the reflective surface 15 near the light source 12 and the incident surface 18 in the main scanning direction, to increase the force of light diffusion in the sub-scanning direction due to the light reflecting patterns 16 as compared to the other regions.

Furthermore, in a middle region of the reflective surface 15 in the main scanning direction, the force of light diffusion in the sub-scanning direction due to the light reflecting patterns 16 needs to be decreased as compared to the other regions.

Moreover, in an end region of the reflective surface 15 near the end of the light guide 11 opposite to the incident surface 18 in the main scanning direction, the force of light diffusion in the sub-scanning direction due to the light reflecting patterns 16 needs to be increased as compared to the middle region.

Therefore, for example, as shown in FIGS. 10 and 11, in a region D1 of the reflective surface 15 near the incident surface 18 in the main scanning direction, the oval hemispherical shape of each light reflecting pattern 16 is formed to provide the same angular component of light illumination in the sub-scanning direction at different locations in the main scanning direction by setting the ratio of the first diameter A to the height h at a small value at a location nearest to the incident surface 18 and then gradually increasing the ratio with the approach to the middle region.

In a region D3 of the reflective surface 15 across the middle region D2 thereof from the region D1 in the main scanning direction, the ratio of the first diameter A to the height h is gradually decreased with the approach to the end of the light guide 11 opposite to the incident surface 18 (the terminal end of the light guide 11 when viewed from the incident surface 18 in the main scanning direction). Thus, a phenomenon can be compensated for in which with the approach to the terminal end of the light guide 11, the angle of incidence onto the light reflecting patterns 16 decreases to narrow the angular distribution of exiting light.

In the middle region D2, the ratio of the first diameter A to the height h of the light reflecting pattern 16 is increased as compared to the other regions, i.e., the region near the incident surface 18 and the end region on the opposite side of the middle region D2 to the incident surface 18.

FIG. 10 shows an example where the light reflecting patterns 16 have the same height h of the oval hemispherical shape in every region and different first diameters A thereof among the regions to give different ratios of the first diameter A to the height h among the regions. On the other hand, FIG. 11 shows an example where the light reflecting patterns 16 have the same first diameter A of the oval hemispherical shape in every region and different heights h thereof among the regions to give different ratios of the first diameter A to the height h among the regions.

The light guide 11 is made by, for example, injection molding in which molten resin is injected into a mold.

As thus far described, in the first embodiment, the light reflecting patterns 16 of oval hemispherical shape are formed on the reflective surface 15 opposed to the exit surface 17 and the ratio of the first diameter A along the sub-scanning direction to the height h of the oval hemispherical shape is varied among locations on the reflective surface 15 in the main scanning direction. Thus, the angular distribution of exiting direct and indirect light due to the light reflecting patterns 16 can be equalized among locations in the main scanning direction. In addition, by controlling the angle of reflection of incident light onto the light reflecting patterns 16 as described above, the amount of change of reflected light in the event of movement of the reading position during reading of the original document or floating of the original document above the surface of the original glass plate 161 can be kept constant throughout the entire light guide 11 in the main scanning direction. Therefore, in the light guide 11 according to the first embodiment, without the need to change its outer shape, the illumination distribution of direct and indirect light in the sub-scanning direction during illumination onto the original document can be equalized at every location in the main scanning direction.

Furthermore, in the first embodiment, the light reflecting patterns 16 arranged at various locations on the reflective surface 15 in the main scanning direction are formed so that the ratio of the first diameter A to the height h for the light reflecting patterns 16 on the region of the reflective surface 15 near the incident surface 18 and the region thereof near the terminal end of the light guide 11 opposite to the incident surface 18 is smaller than that for the light reflecting patterns 16 on the middle region thereof. Thus, in response to the phenomenon in which the region of the light guide 11 near the light source 12 and the incident surface 18 in the main scanning direction provides much direct light and little indirect light, the middle region thereof provides mainly indirect light, and the angular distribution of light beams of indirect light incident on the light reflecting patterns 16 becomes smaller with the approach to the terminal end of the light guide 11, the angular distribution of exiting light beams from the light guide 11 in the sub-scanning direction can be equalized at every location in the main scanning direction.

For example, in a general illumination system using indirect light only, incident light must be totally reflected once or more on the outer peripheral surface of the light guide, so that illuminating light from the region near the LED-light incident surface can hardly be obtained. Therefore, a certain distance from near the LED-light incident surface is required in order to obtain a necessary intensity of illuminating light, which requires a longer light guide than the size of an original document to be read, resulting in hindrance to size reduction of the device.

On the other hand, in a general illumination system in which the outer peripheral shape of the light guide is changed overall or locally in the longitudinal direction, the light guide itself must be deformed and therefore has profiles varying with cross section. This is problematic in that a mold for making the light guide is complicated, warpage or other adverse effects are likely to occur during molding, and the attitude of the light guide incorporated in the device is difficult to hold.

In the light guide 11 according to the first embodiment, without the need to change its outer shape, the illumination distribution of direct and indirect light in the sub-scanning direction during illumination onto the original document can be equalized at every location in the main scanning direction.

Next, a description will be given of a light guide 11 and an illumination device 10 according to a second embodiment of the present disclosure. Unless otherwise specified, the structures of the light guide 11 and the illumination device 10 according to the second embodiment are the same as those in the first embodiment described with reference to FIGS. 1 to 9. In relation to the structures of the light guide 11 and the illumination device 10 according to the second embodiment, different elements from the first embodiment will be mainly described below. The illumination device 10 according to the second embodiment includes the light guide 11 according to the second embodiment.

The second embodiment will be described with reference to FIG. 5. Also in the light guide 11 according to the second embodiment, each light reflecting pattern 16 has an oval hemispherical shape rising toward the exit surface 17. However, in the second embodiment, the light reflecting pattern 16 is formed so that a first diameter A thereof along a certain direction is longer than a second diameter B thereof perpendicular to the first diameter A. For example, the light reflecting patterns 16 shown in FIG. 5 are formed so that the first diameter A thereof extends along the sub-scanning direction (the direction perpendicular to the direction of the optical axis) as the certain direction and is longer than the second diameter B thereof along the main scanning direction (the direction of the optical axis).

In the second embodiment, the light reflecting patterns 16 on the reflective surface 15 of the light guide 11 are formed to vary, depending upon the location on the reflective surface 15 in the main scanning direction, the ratio of the first diameter A to the height h of the oval hemispherical shape when viewed laterally in the main scanning direction. All the light reflecting patterns 16 have the same oval hemispherical shape. The light reflecting patterns 16 are formed to vary the ratio of the first diameter A to the height h of the oval hemispherical shape when viewed laterally in the main scanning direction, specifically by varying the orientation angle thereof with respect to the main scanning direction depending upon the location on the reflective surface 15 in the main scanning direction. Thus, the diffusion force of light can be controlled by the light reflecting patterns 16 at each location on the reflective surface 15 in the main scanning direction to achieve an equalized illumination distribution in the sub-scanning direction throughout the entire region of the light guide 11 in the main scanning direction.

Figure 12:
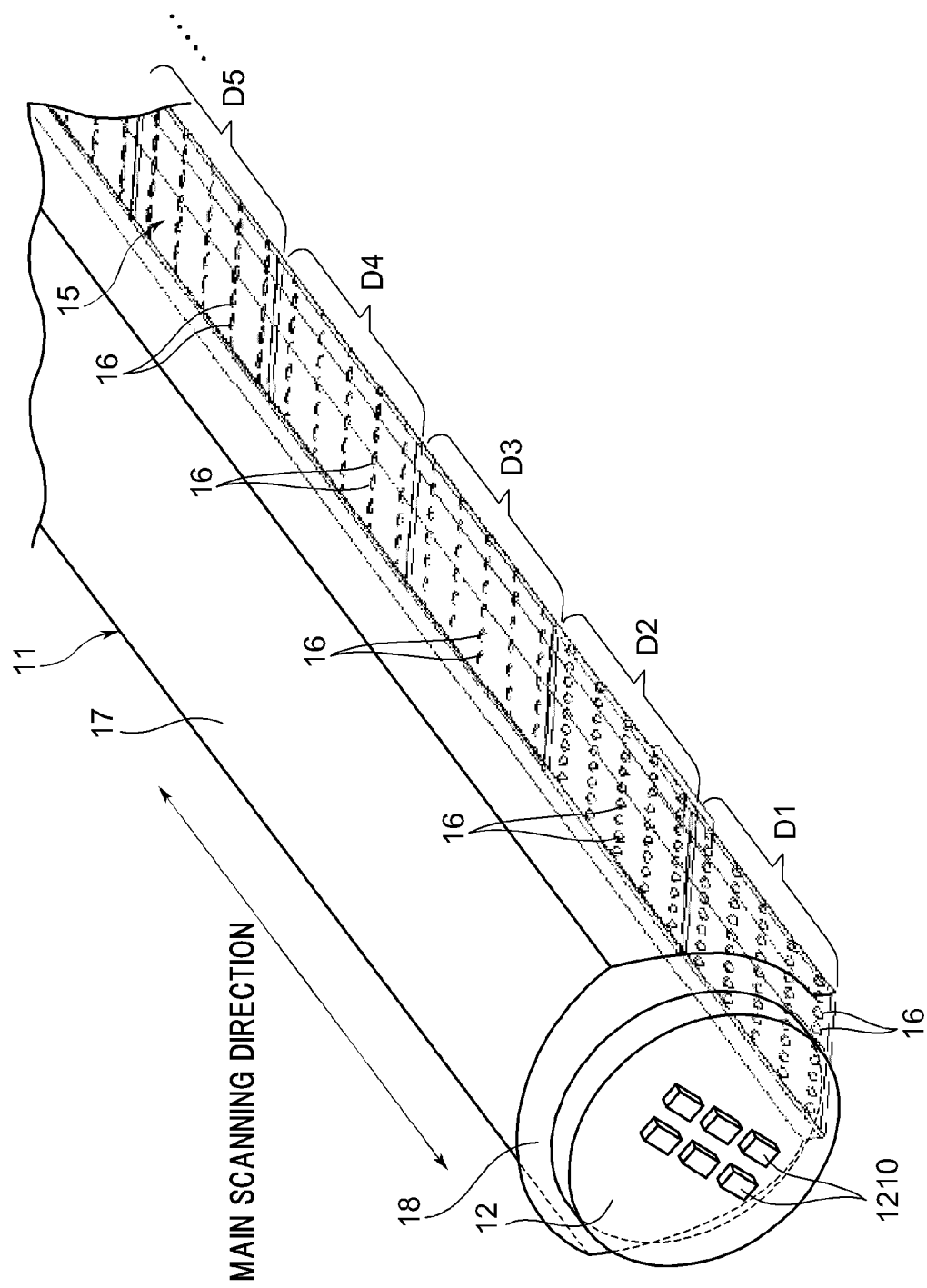
FIG. 12 is a perspective view showing a light guide having light reflecting patterns in which the ratio of the first diameter to the height of the oval hemispherical shape when viewed laterally in the main scanning direction varies among different regions of the light guide in the main scanning direction.
Figure 13:
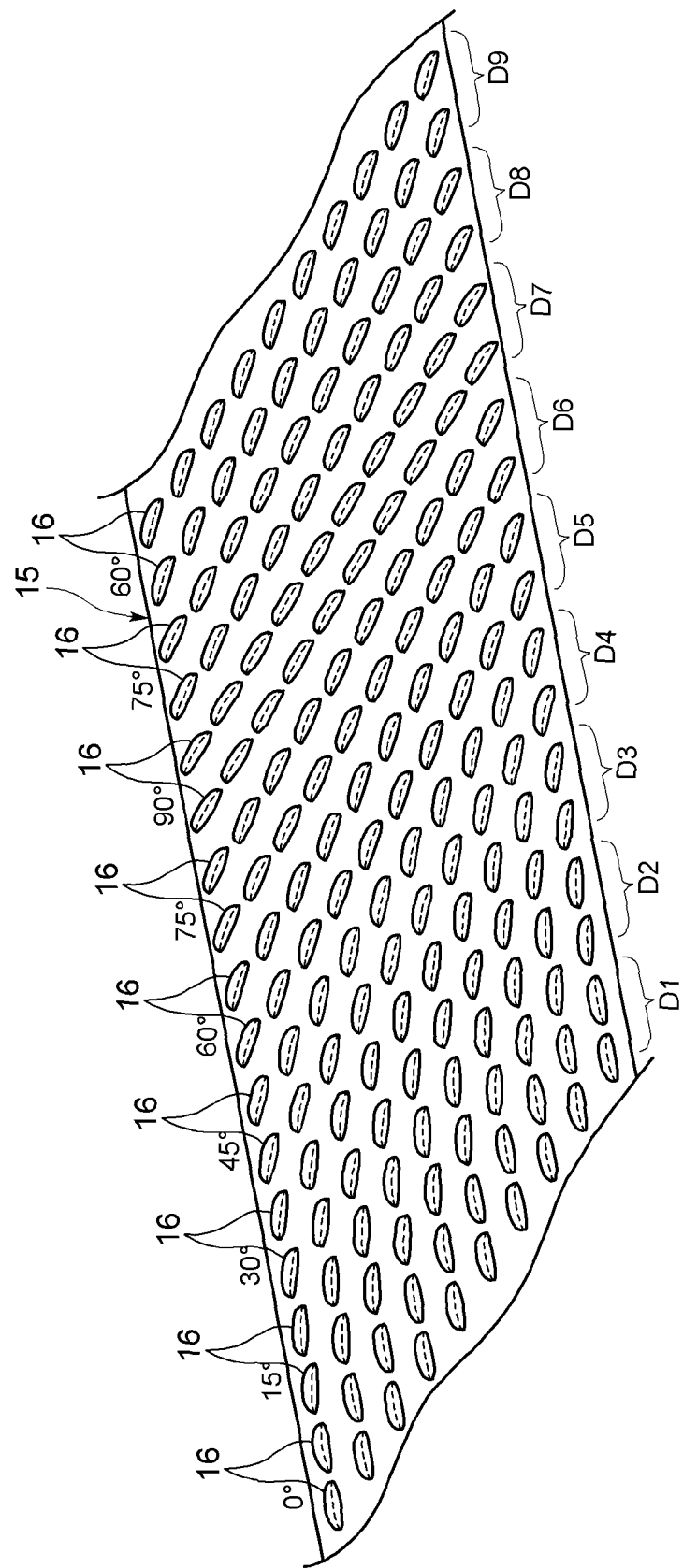
FIG. 13 is a perspective view showing light reflecting patterns with different ratios of the first diameter to the height of the oval hemispherical shape.

A description will be given of the control of the ratio of the first diameter A to the height h of the oval hemispherical shape of the light reflecting patterns 16 necessary to achieve an equalized illumination distribution in the sub-scanning direction throughout the entire region of the light guide 11 in the main scanning direction in the second embodiment. The description thereof will be given with reference to FIG. 9 and additionally FIG. 12. FIG. 12 is a perspective view showing the light guide 11 having light reflecting patterns 16 in which the ratio of the first diameter A to the height h of the oval hemispherical shape when viewed laterally in the main scanning direction varies among different regions of the light guide 11 in the main scanning direction. FIG. 13 is a perspective view showing the light reflecting patterns 16 with different ratios of the first diameter A to the height h of the oval hemispherical shape when viewed laterally in the main scanning direction.

Figure 14:
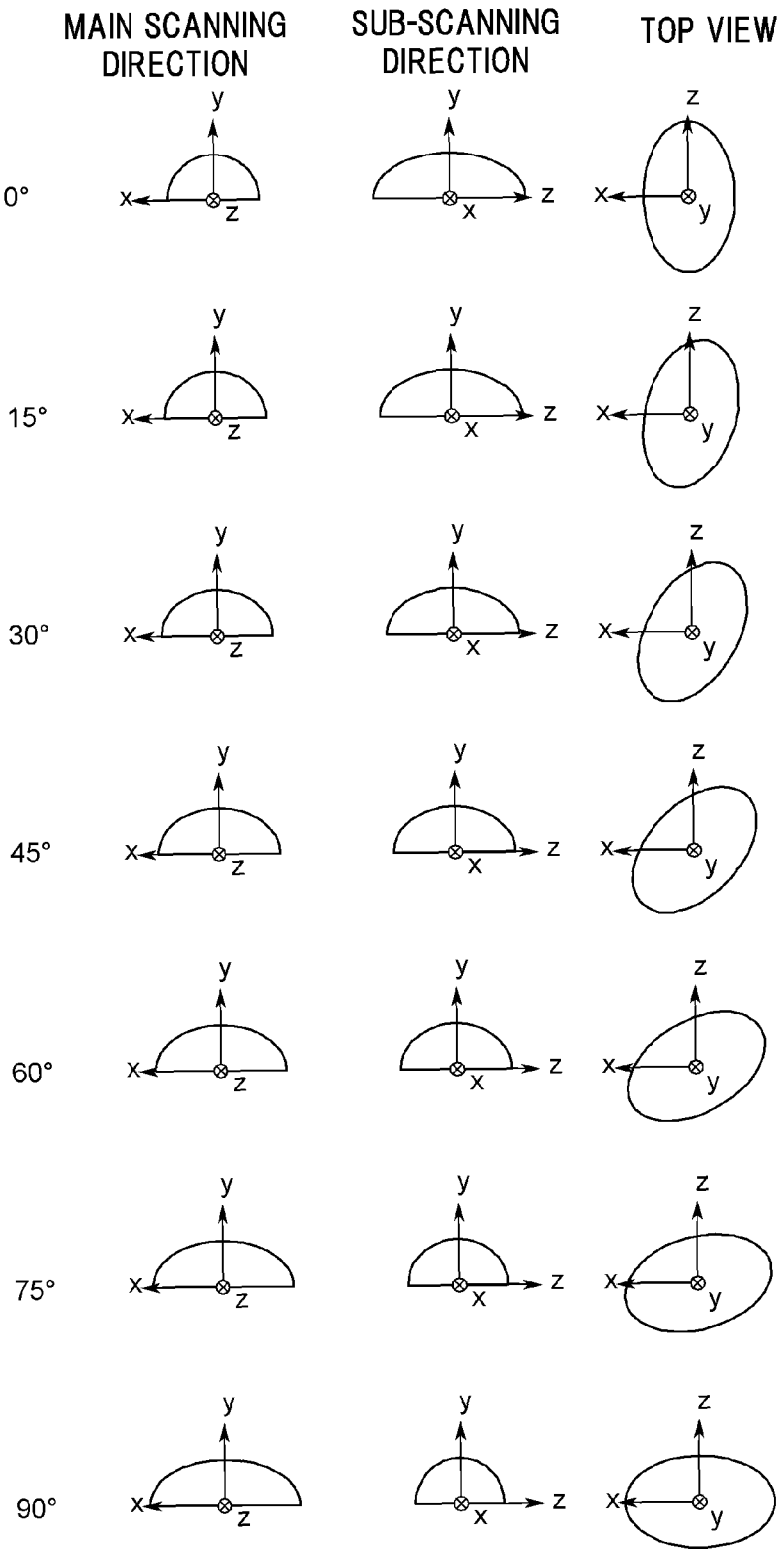
FIG. 14 is a diagram showing different light reflecting patterns of different orientation angles between 0 and 90 degrees with respect to the main scanning direction.

FIG. 14 is a diagram showing different light reflecting patterns 16 of different orientation angles with respect to the main scanning direction.

FIGS. 12 and 13 merely conceptually illustrate differences among various locations in the main scanning direction in terms of the orientation angle of the light reflecting pattern 16 and the ratio of the first diameter A to height h thereof when viewed laterally. Therefore, FIGS. 12 and 13 are shown differently from each other in the number of rows of light reflecting patterns 16 at each region. Furthermore, to clarify the structure of the light guide 11, FIGS. 12 and 13 show arrangements of the light reflecting patterns 16 on the reflective surface 15 in which the light reflecting patterns 16 are different in number from those applied to the actual light guide 11.

In the second embodiment, the following configurations are taken while consideration is given likewise to: (a) the characteristics shown in FIGS. 8 and 9; (b) that in a middle region of the reflective surface 15 in the main scanning direction, the force of light diffusion in the sub-scanning direction due to the light reflecting patterns 16 needs to be decreased as compared to the other regions; and (c) that in an end region of the reflective surface 15 near the end of the light guide 11 opposite to the incident surface 18 in the main scanning direction, the force of light diffusion in the sub-scanning direction due to the light reflecting patterns 16 needs to be increased as compared to the middle region.

In the second embodiment, all the light reflecting patterns 16 formed on the reflective surface 15 have the same shape and the ratio between the first diameter A and the second diameter B is set so that the distribution of direct light and the distribution of indirect light become equal to each other when the orientation angle of the light reflecting pattern 16 with respect to the main scanning direction is 0 and 90 degrees. In other words, in order to conform the angular component of direct light to the angular component of indirect light, the direct light needs to be given a light diffusion force in the sub-scanning direction equal to that of the indirect light. For example, if the light reflecting pattern 16 has the maximum diffusion force at an orientation angle of zero degrees and the minimum diffusion force at an orientation angle of 90 degrees, the ratio between the first diameter A and the second diameter B of the light reflecting pattern 16 is set so that the distribution component of the direct light due to the maximum diffusion force at an orientation angle of zero degrees becomes equal to the distribution component of the indirect light at an orientation angle of 90 degrees. Thus, the distribution of light in the sub-scanning direction can be equalized at every location in the main scanning direction.

For example, as shown in FIG. 12, the reflective surface 15 is divided into a plurality of regions in the main scanning direction and the orientation angle of the light reflecting pattern 16 with respect to the main scanning direction is varied for the different regions. Alternatively, as shown in FIG. 13, the light reflecting patterns 16 may be gradually varied in orientation angle with increasing distance from the light source 12 and the incident surface 18.

For example, in relation to the configuration shown in FIG. 12, in a region D1 of the reflective surface 15 near the incident surface 18 in the main scanning direction, the orientation angle of the light reflecting patterns 16 with respect to the main scanning direction is zero degrees (i.e., the angle of the first diameter A with respect to the main scanning direction=0 (degrees)), so that the ratio of the first diameter A to the height h when viewed laterally in the main scanning direction is set small.

Next, in a region D2 of the reflective surface 15 nearer to a middle region D7 than the region D1 in the main scanning direction of the light guide 11, the orientation angle of the light reflecting patterns 16 with respect to the main scanning direction is 15 degrees (i.e., the angle of the first diameter A with respect to the main scanning direction=15 (degrees)), so that the ratio of the first diameter A to the height h when viewed laterally in the main scanning direction is set greater than that in the region D1.

Likewise, in regions D3, D4, D5, and D6 gradually approaching the middle region D7, their orientation angles of the light reflecting patterns 16 with respect to the main scanning direction (i.e., the respective angles of the first diameter A with respect to the main scanning direction) are 30, 45, 60, and 75 degrees, respectively, so that the ratio of the first diameter A to the height h when viewed laterally in the main scanning direction is gradually increased with the approach to the middle region D7.

In this embodiment, in the middle region D7, the orientation angle of the light reflecting patterns 16 with respect to the main scanning direction is 90 degrees (i.e., the angles of the first diameter A with respect to the main scanning direction=90 (degrees)), so that the ratio of the first diameter A to the height h when viewed laterally in the main scanning direction is maximum.

In this manner, the orientation angle of the light reflecting patterns 16 with respect to the main scanning direction is set to provide the same angular component of light illumination in the sub-scanning direction at every location in the main scanning direction by gradually increasing the above ratio with the approach from the region of the reflective surface 15 near the incident surface 18 to the middle region thereof in the main scanning direction.

Furthermore, in a region D8 and subsequent regions across the middle region D7 from the region D6 in the main scanning direction, the orientation angle of the light reflecting patterns 16 with respect to the main scanning direction in their regions is gradually decreased with the approach to the end of the light guide 11 opposite to the incident surface 18 (the terminal end of the light guide 11 when viewed from the incident surface 18 in the main scanning direction), thereby gradually decreasing the ratio of the first diameter A to the height h when viewed laterally in the main scanning direction. For example, in the successive regions gradually approaching from the region D8 to the terminal end of the light guide 11, their respective orientation angles of the light reflecting patterns 16 with respect to the main scanning direction are 75, 60, 45, 30, 15, and 0 degrees, so that the ratio of the first diameter A to the height h when viewed laterally in the main scanning direction is gradually decreased with distance from the middle region D7.

Thus, a phenomenon can be compensated for in which with the approach to the terminal end of the light guide 11, the angle of incidence onto the light reflecting patterns 16 decreases to narrow the angular distribution of exiting light.

In the middle region D7, the ratio of the first diameter A to the height h of the light reflecting pattern 16 when viewed laterally is increased as compared to the other regions, i.e., the region near the incident surface 18 and the end region on the opposite side of the middle region D7 to the incident surface 18.

As thus far described, in the second embodiment, the light reflecting patterns 16 of oval hemispherical shape are formed on the reflective surface 15 opposed to the exit surface 17 and the ratio of the first diameter A to the height h when viewed laterally in the main scanning direction is varied among locations on the reflective surface 15 in the main scanning direction. Thus, the angular distribution of exiting direct and indirect light due to the light reflecting patterns 16 can be equalized among locations in the main scanning direction. In addition, by controlling the angle of reflection of incident light onto the light reflecting patterns 16 as described above, the amount of change of reflected light in the event of movement of the reading position during reading of the original document or floating of the original document above the surface of the original glass plate 161 can be kept constant throughout the entire light guide 11 in the main scanning direction. Therefore, in the light guide 11 according to this embodiment, without the need to change its outer shape, the illumination distribution of direct and indirect light in the sub-scanning direction during illumination onto the original document can be equalized at every location in the main scanning direction.

Furthermore, in the second embodiment, the light reflecting patterns 16 arranged at various locations on the reflective surface 15 in the main scanning direction are formed so that the light reflecting patterns 16 on the region of the reflective surface 15 near the incident surface 18 and the region thereof near the terminal end of the light guide 11 opposite to the incident surface 18 have smaller ratios of the first diameter A to the height h when viewed laterally in the main scanning direction than those on the middle region thereof. Thus, in response to the phenomenon in which the region of the light guide 11 near the light source 12 and the incident surface 18 in the main scanning direction provides much direct light and little indirect light, the middle region thereof provides mainly indirect light, and the angular distribution of light beams of indirect light incident on the light reflecting patterns 16 becomes smaller with the approach to the terminal end of the light guide 11, the angular distribution of exiting light beams from the light guide 11 in the sub-scanning direction can be equalized at every location in the main scanning direction.

Figure 15:
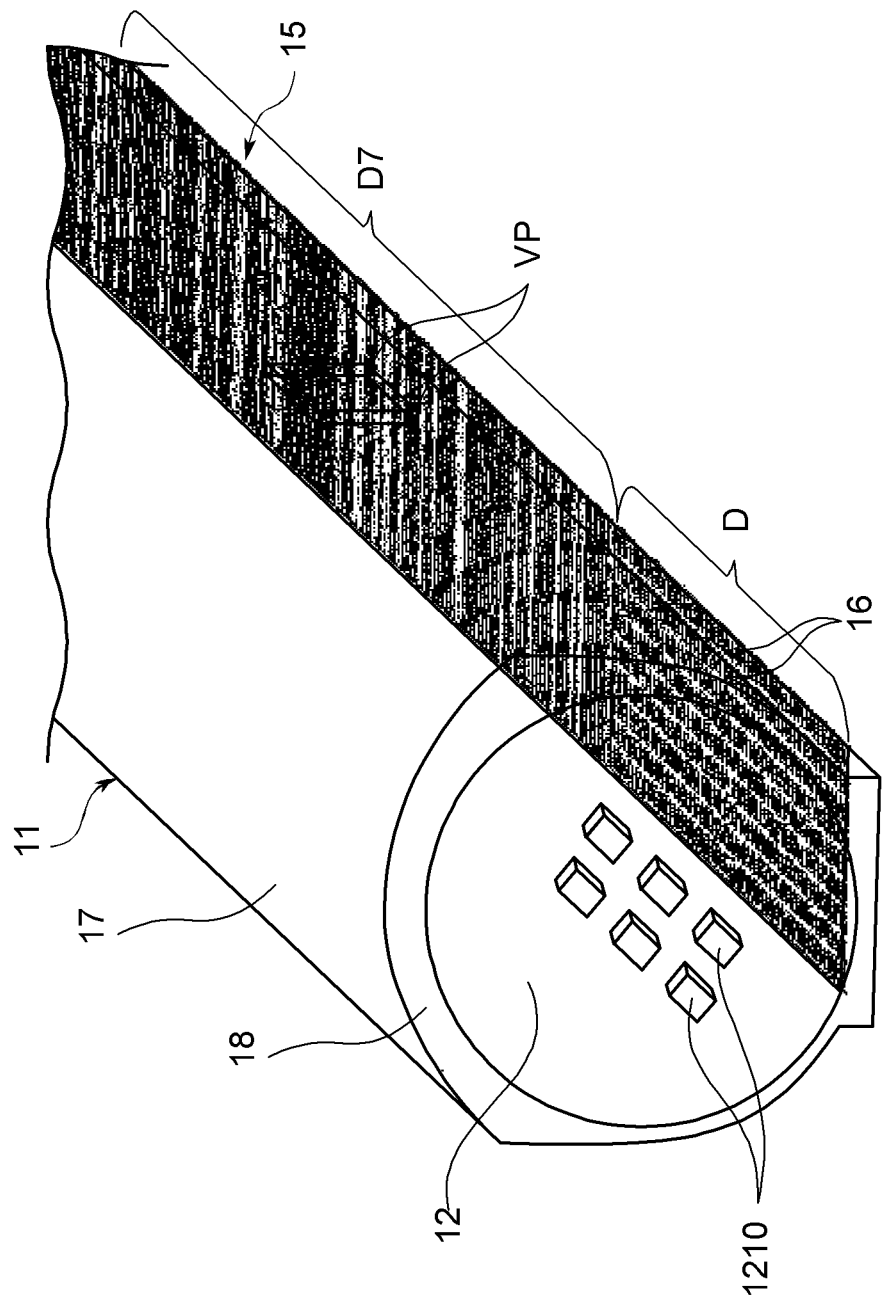
FIG. 15 is a perspective view showing a light guide having light reflecting patterns in another embodiment.

The present disclosure is not limited to the above embodiments and can be modified in various ways. For example, if in the first embodiment the entire length of the light guide 11 is reduced, there may be a need to control the angular distribution of exiting light in the sub-scanning direction in a region near the incident surface 18 in the main scanning direction where much direct light and little indirect light are provided, whereas there may be no need to control the same in other regions in the main scanning direction where direct light has a small effect and indirect light has a major effect. In this case, as shown in FIG. 15, in a region D from the incident surface 18 to the near side of the region D7 mainly providing indirect light, where much direct light is provided, the ratio of the first diameter A to the height h of the light reflecting patterns 16 is gradually increased from the start point of the region D to the end point thereof in the main scanning direction. Formed in the region D7 are inverted V-shaped light reflecting patterns VP as described previously, which have no deflection component in the sub-scanning direction but exhibit better light output efficiency than the light reflecting patterns 16. In applying the case to the second embodiment, in the region D from the incident surface 18 to the near side of the region D7 mainly providing indirect light, where much direct light is provided, the ratio of the first diameter A to the height h of the light reflecting patterns 16 when viewed laterally in the main scanning direction is gradually increased from the start point of the region D to the end point thereof in the main scanning direction by gradually increasing the orientation angle of the light reflecting patterns 16 with respect to the main scanning direction from small to large angles.

Thus, in the first and second embodiments, the illumination device 10 can illuminate with a high light output efficiency. Although not shown, cylindrical, oval, aspherical or other shapes may be employed as the light reflecting patterns VP.

Although in each of the above embodiments a structure has been described in which only one end surface of the light guide 11 in the main scanning direction provides an incident surface 18 and the light source 12 emits light from one longitudinal end of the light guide 11, another structure may be employed in which both end surfaces of the light guide 11 in the main scanning direction provide incident surfaces 18 and light sources 12 mounted to both the end surfaces emit light to the interior of the light guide 11. Also in this case, like the case where the light source 12 is provided at one longitudinal end of the light guide 11, the ratio of the first diameter A to the height h of the light reflecting patterns 16 may be varied among regions of the reflective surface 15 in the main scanning direction depending upon the distribution of direct light or indirect light or the angular distribution of light beams incident on the light reflecting patterns 16 at each location of the reflective surface 15 in the main scanning direction. In the second embodiment, the ratio of the first diameter A to the height h of the light reflecting patterns 16 when viewed laterally in the main scanning direction is varied among regions of the reflective surface 15 in the main scanning direction by changing the orientation angle of the light reflecting patterns 16 with respect to the main scanning direction depending upon the angular distribution of light beams incident on the light reflecting patterns 16.

In such a light guide 11 equipped at both longitudinal ends with incident surfaces 18 and light sources 12, direct light near the incident surfaces 18 at both longitudinal ends of the light guide 11 tends to have a small angular distribution of light beams incident on the light reflecting patterns 16 and the angular distribution of light beams incident on the light reflecting patterns 16 tends to increase with the approach to the middle portion of the light guide 11 in the main scanning direction. In this case, by setting the ratio of the first diameter A to the height h of the light reflecting patterns 16 in the above manner, the angular distribution of exiting light from the light guide 11 in the sub-scanning direction can be equalized at every location in the main scanning direction.

To obtain a necessary intensity of light at each location of the light guide 11 in the main scanning direction, the number of light reflecting patterns 16 arranged may be varied with location or the light reflecting patterns 16 may be varied in size with location while keeping the ratio between the diameter along the main scanning direction and the diameter along the sub-scanning direction.

Although each of the above embodiments includes LEDs 1210 as the light source 12, the light source used in the present disclosure is not limited to LEDs and can include various types of light sources so long as they can emit light in the main scanning direction toward the interior of the light guide 11.

The structure and processing shown in each of the above embodiments with reference to FIGS. 1 to 15 are merely illustrative of the present disclosure and not intended to limit the present disclosure to the above particular structure and processing.

Various modifications and alterations of this disclosure will be apparent to those skilled in the art without departing from the scope and spirit of this disclosure, and it should be understood that this disclosure is not limited to the illustrative embodiments set forth herein.

The invention claimed is:

1. A light guide formed of a light transmissive member extending in a direction of an optical axis of light incident on an interior of the light guide and configured to reflect the incident light in a specific direction, the light guide comprising:

an incident surface provided at least one of both longitudinal ends of the light guide and allowing light emitted from a light source to be incident thereon;

an exit surface forming one side surface of the light guide extending in the direction of the optical axis of the light incident through the incident surface, the exit surface allowing the incident light to exit the light guide therethrough; and a reflective surface located opposite to the exit surface to extend in the direction of the optical axis and including a plurality of light reflecting patterns formed to reflect the incident light toward the exit surface, wherein the light reflecting patterns have an oval hemispherical shape rising toward the exit surface and are formed to vary, depending upon location on the reflective surface in the direction of the optical axis, a ratio of a first diameter of the oval hemispherical shape to a height thereof when viewed laterally in the direction of the optical axis, the first diameter being a direction perpendicular to the direction of the optical axis, the light reflecting patterns are formed in a plurality of rows, each extending along the optical axis, and are disposed side by side along each of the rows that are aligned in the direction perpendicular to the direction of the optical axis, and the light reflecting patterns disposed side by side in one row are formed so that the first diameter thereof perpendicular to the direction of the optical axis is equal to or longer than a second diameter thereof along the direction of the optical axis, and so that the ratio of the first diameter to the height for the light reflecting patterns formed near the incident surface and near the longitudinal end of an optical guide opposite to the incident surface in the direction of the optical axis is smaller than the ratio of the first diameter to the height for the light reflecting patterns formed on a middle region of the reflective surface in the direction of the optical axis by having different orientation angles thereof with respect to the direction of the optical axis depending upon the location on the reflective surface in the direction of the optical axis, and the plurality of light reflecting patterns that are arranged on a same location in the direction of the optical axis and are aligned in the direction perpendicular to the direction of the optical axis are all formed so as to have same angles in the orientation angles and be in same shape, so that all of the ratios of the first diameter to the height for the plurality of light reflecting patterns aligned in the direction perpendicular to the direction of the optical axis are same.

2. The light guide according to claim 1, wherein the light reflecting patterns are varied in the ratio of the first diameter to the height by having the same height and different lengths of the first diameter depending upon the location on the reflective surface in the direction of the optical axis.

3. The light guide according to claim 1, wherein the light reflecting patterns are varied in the ratio of the first diameter to the height by having the same first diameter and different heights depending upon the location on the reflective surface in the direction of the optical axis.

4. The light guide according to claim 1, wherein the light reflecting patterns are formed near the incident surface in the direction of the optical axis so that the ratio of the first diameter to the height for the light reflecting patterns is increased with distance from the incident surface in the direction of the optical axis.

5. The light guide according to claim 1, wherein each of both end surfaces of the light guide located at both the longitudinal ends thereof in the direction of the optical axis is the incident surface.

6. The light guide according to claim 5, wherein the light reflecting patterns arranged on the locations on the reflective surface are formed so that the ratio for the light reflecting patterns formed near both the incident surfaces is smaller than the ratio for the light reflecting patterns formed on a middle region of the reflective surface in the direction of the optical axis.

7. The light guide according to claim 5, wherein the light reflecting patterns are formed near both the incident surfaces in the direction of the optical axis so that the ratio for the light reflecting patterns is increased with distance from each of the incident surfaces in the direction of the optical axis.

8. An illumination device comprising:
a light guide formed of a light transmissive member extending in a direction of an optical axis of light incident on an interior of the light guide and configured to reflect the incident light in a specific direction; and
a light source configured to emit light toward an interior of the light guide in a length direction of the light guide to allow the light to enter the light guide through an incident surface,
wherein the light guide comprises:
the incident surface provided at least one of both longitudinal ends of the light guide and allowing light emitted from the light source to be incident thereon;
an exit surface forming one side surface of the light guide extending in the direction of the optical axis of the light incident through the incident surface, the exit surface allowing the incident light to exit the light guide therethrough; and
a reflective surface located opposite to the exit surface to extend in the direction of the optical axis and including a plurality of light reflecting patterns formed to reflect the incident light toward the exit surface, and
wherein the light reflecting patterns have an oval hemispherical shape rising toward the exit surface and are formed to vary, depending upon location on the reflective surface in the direction of the optical axis, a ratio of a first diameter of the oval hemispherical shape to a height thereof when viewed laterally in the direction of the optical axis, the first diameter being a direction perpendicular to the direction of the optical axis,
the light reflecting patterns are formed in a plurality of rows, each extending along the optical axis, and are disposed side by side along each of the rows that are aligned in the direction perpendicular to the direction of the optical axis, and the light reflecting patterns disposed side by side in one row are formed so that the first diameter thereof perpendicular to the direction of the optical axis is equal to or longer than a second diameter thereof along the direction of the optical axis, and so that the ratio of the first diameter to the height for the light reflecting patterns formed near the incident surface and near the longitudinal end of an optical guide opposite to the incident surface in the direction of the optical axis is smaller than the ratio of the first diameter to the height for the light reflecting patterns formed on a middle region of the reflective surface in the direction of the optical axis by having different orientation angles thereof with respect to the direction of the optical axis depending upon the location on the reflective surface in the direction of the optical axis, and
the plurality of light reflecting patterns that are arranged on a same location in the direction of the optical axis and are aligned in the direction perpendicular to the direction of the optical axis are all formed so as to have same angles in the orientation angles and be in same shape, so that all of the ratios of the first diameter to the height for the plurality of light reflecting patterns aligned in the direction perpendicular to the direction of the optical axis are same.

* * * * *